(12) United States Patent
Aschenbrenner et al.

(10) Patent No.: US 7,944,593 B2
(45) Date of Patent: May 17, 2011

(54) METHOD AND APPARATUS FOR EFFICIENT PROCESSING OF COLOR CONVERSION

(75) Inventors: Jean Margaret Aschenbrenner, Boulder, CO (US); Reinhard Heinrich Hohensee, Boulder, CO (US); Yue Qiao, Longmont, CO (US); Nenad Rijavec, Longmont, CO (US); David Earl Stone, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 1676 days.

(21) Appl. No.: 11/145,820

(22) Filed: Jun. 6, 2005

(65) Prior Publication Data
US 2006/0050288 A1    Mar. 9, 2006

Related U.S. Application Data

(60) Provisional application No. 60/608,324, filed on Sep. 9, 2004.

(51) Int. Cl.
*G03F 3/08* (2006.01)
*H04N 1/46* (2006.01)
*G09G 5/02* (2006.01)

(52) U.S. Cl. ........ 358/518; 358/523; 358/525; 345/601; 345/602; 345/603; 345/604

(58) Field of Classification Search .............. 719/310, 719/328; 715/823, 769, 745, 275, 273, 243; 382/201, 167, 237, 274, 275, 745, 273; 358/529, 358/527, 323, 520, 504, 528, 518, 1.18, 1.9; 258/1.19, 1.16, 518, 525, 504
See application file for complete search history.

(56) References Cited

U.S. PATENT DOCUMENTS
5,646,752 A * 7/1997 Kohler et al. ............... 358/520
(Continued)

FOREIGN PATENT DOCUMENTS
EP    1041817 A2 * 10/2002
(Continued)

OTHER PUBLICATIONS

Abet,S "a nueral network approach for RGB to CMYK", Aug. 22-26, 1994,IEEE,vol. 1, pp. 6-9.*

(Continued)

*Primary Examiner* — Benny Q Tieu
*Assistant Examiner* — Haris Sabah
(74) *Attorney, Agent, or Firm* — Duft Bornsen & Fishman LLP

(57) ABSTRACT

The management of color presented at end point devices such as a display or printer is based on the implementation of a Color Management Resource (herein also CMR). A CMR is an architected resource stored accessibly to a print server or other processor that is used to carry all of the color management information required to render a print file, document, page, or data object. The invention here described is particularly focused on a color conversion type of CMR and defines a new type here called a Link Color Conversion CMR. In particular, a unique descriptor is tied to each input and output color conversion rule. A linked color conversion rule, created by combining the input and output color conversion, is created. The linked color conversion structure contains three parts—the descriptor of the input color conversion rule, the descriptor of the output color conversion rule, and the combined color conversion rule. By comparing the descriptors, it is possible to very rapidly identify a previously-existing linked color conversion that combines the input and output conversions.

18 Claims, 3 Drawing Sheets

U.S. PATENT DOCUMENTS

| | | | | |
|---|---|---|---|---|
| 5,699,489 | A | 12/1997 | Yokomizo | 395/109 |
| 5,787,193 | A | 7/1998 | Balasubramanian | 382/167 |
| 5,806,081 | A * | 9/1998 | Swen et al. | 715/202 |
| 5,809,181 | A | 9/1998 | Metcalfe | 382/276 |
| 6,049,399 | A | 4/2000 | Shyu | 358/520 |
| 6,141,120 | A * | 10/2000 | Falk | 358/504 |
| 6,198,552 | B1 * | 3/2001 | Nagae | 358/518 |
| 6,275,607 | B1 | 8/2001 | Shimizu et al. | 382/167 |
| 6,349,146 | B2 | 2/2002 | Roetling | 382/162 |
| 6,392,699 | B1 | 5/2002 | Acharya | 348/273 |
| 6,603,483 | B1 * | 8/2003 | Newman | 345/593 |
| 6,642,931 | B1 * | 11/2003 | Haikin et al. | 345/601 |
| 6,693,643 | B1 | 2/2004 | Trivedi et al. | 345/602 |
| 6,731,396 | B1 * | 5/2004 | Buis et al. | 358/1.15 |
| 6,753,988 | B1 | 6/2004 | Eldredge | 358/535 |
| 6,758,574 | B1 | 7/2004 | Roberts | 362/162 |
| 7,342,683 | B2 * | 3/2008 | Lin et al. | 358/1.9 |
| 7,430,063 | B2 * | 9/2008 | Aschenbrenner et al. | 358/1.9 |
| 2002/0038468 | A1 * | 3/2002 | Leviten | 800/18 |
| 2002/0081021 | A1 * | 6/2002 | Borg | 382/162 |
| 2002/0142804 | A1 * | 10/2002 | Morozumi | 455/557 |
| 2004/0109035 | A1 * | 6/2004 | Otokita et al. | 347/5 |
| 2004/0160454 | A1 * | 8/2004 | Asano | 345/589 |
| 2004/0184104 | A1 * | 9/2004 | Yamamoto et al. | 358/2.1 |
| 2005/0036172 | A1 * | 2/2005 | Miyazawa et al. | 358/2.1 |
| 2005/0068586 | A1 * | 3/2005 | Sano | 358/2.1 |

FOREIGN PATENT DOCUMENTS

| | | |
|---|---|---|
| EP | 1376532 A2 * | 1/2004 |
| JP | 3229573 A | 10/1991 |
| JP | 4021264 A | 8/1993 |

OTHER PUBLICATIONS

Gupta,M.R "color conversion using maximum entropy", Oct. 7-10, 2001, IEEE, vol. 1, pp. 118-121(1-4).*

* cited by examiner

Fig. 3

| Index to RG | Table Vectors in RG | |
|---|---|---|
| | TV Type | TV Content |
| CMR name | File name TV | File Name for CMR(x) — 301 |
| | Object OID TV | Object ID for CMR(x) — 302 |
| | Device CMR TV | CMR Name (A) — 303 |
| | | CMR Name (B) |
| | | CMR Name (C) |
| CMRName(A) | File name TV | File Name for CMR(A) — 304 |
| | Object OID TV | Object ID for CMR(A) |
| CMRName(B) | File name TV | File Name for CMR(B) — 305 |
| | Object OID TV | Object ID for CMR(B) |
| CMRName(C) | File name TV | File Name for CMR(C) — 306 |
| | Object OID TV | Object ID for CMR(C) |

METHOD AND APPARATUS FOR EFFICIENT PROCESSING OF COLOR CONVERSION

CROSS REFERENCE TO RELATED APPLICATIONS

This application claims priority from Provisional Application Ser. No. 60/608,324 filed 9 Sep. 2004.

This application is related to the following co-pending and commonly-assigned patent application, which is hereby incorporated herein by reference in its respective entirety:

"Method and Apparatus for color management" to Aschenbrenner et al., US application Ser. No. 11/077,687.

FIELD OF THE INVENTION

The present invention relates to color output and more particularly to improving the performance and consistency of color output of presentation data by a presentation device.

BACKGROUND TO THE INVENTION

A presentation architecture such as the Advanced Function Presentation (AFP) is used to handle input streams and data and output information on many different types of printers—monochrome/color, impact/non-impact, continuous-form/cut-sheet—as well as on other output technologies such as displays. When the information to be output contains color data, it is important that the colors are rendered accurately and consistently across all device technologies. On color devices the colors should be rendered as accurately as the device gamut allows; on monochrome devices the colors should be simulated with pleasing grayscales.

When printing colored (including grayscale) data, it is often necessary to convert from one color space to another. For example the input data is specified in one device-dependent color space (such as RGB from a scanner) and must be converted into the output color space of the rendering device (such as the printer's CMYK). Typically the color conversion is specified in two parts: a first conversion from the input color space to a device-independent Profile Connection Space (PCS); and a second conversion from the Profile Connection Space to the output device color space. For example, color conversion in a Lookup Table (LUT) based ICC profile often involves at least four process steps: matrix multiplication, use of a one dimensional input lookup table, use of a multidimensional lookup table, and use of a one dimensional output table. This conversion is compute intensive and two such conversions are required, one from the input color space to PCS, and the other from PCS to the output color space. This conversion is done for each pixel of the image. For performance enhancement, devices typically combine the two conversions so that fewer operations are required. This combination is done once for the given pair of color conversions and then used many times, once for each pixel.

However, each image in a printfile may have a different input color space, so the conversion combination needs to happen for each image. The combining process itself is computationally intensive. Sometimes each image specifies the input color space conversion. Often the conversions are the same but this is not known, so the conversion-combination must be redone. This adversely impacts performance dependent on image size.

In the prior art there are several examples of schemes for converting from an input color space to an output color space suitable for printing.

For example, U.S. Pat. No. 5,809,181 and JP 3229753A disclose interpolation schemes for converting from an input color space to an output color space.

Further for example, U.S. Pat. No. 5,699,489 discloses a scheme in which a transmitter and a receiver use a communication protocol to determine the color space conversion capabilities of each side and agree on the color space conversion to be carried out by each side.

Further for example, U.S. Pat. No. 6,758,574 discloses efficient methods for conversion from an input color space to an intermediate color space and from the intermediate color space to an output color space.

Further for example, U.S. Pat. No. 5,787,193 discloses a method for converting from an RGB input color space to a CMYK output color space using look-up tables. Further the number of bits used for each RGB input when converting to each CMY output, is varied in order to emphasize one particular input color for each particular output color.

Further for example, U.S. Pat. No. 6,349,146 discloses converting an image from a device-independent color space to a device-biased color space and then to a device-specific color space. The conversion is such that it can be reversed without loss of data.

However, while the prior art addresses several methods for converting from a first color space to a second color space none provide a method of efficiently supporting conversion from any one of plurality of input color spaces to any one of a plurality of output color spaces. For example, in the prior art such conversion requires specific communication flows in order to determine the appropriate conversion to perform.

SUMMARY OF THE INVENTION

According to a first aspect the present invention provides A method comprising: obtaining a first descriptor value for an input color space associated with presentation data in a data stream received for output at a presentation device; obtaining a second descriptor value for an output color space of the presentation device; and using the first and second descriptor value to obtain a link color conversion color management resource (CMR) comprising the first and second descriptor values and a rule for converting the input color space to the output color space.

According to a second aspect the present invention provides a data processing system comprising: an obtainer for obtaining a first descriptor value for an input color space associated with presentation data in a data stream received for output at a presentation device; an obtainer for obtaining a second descriptor value for an output color space of the presentation device; and a performer for using the first and second descriptor value to obtain a link color conversion color management resource (CMR) comprising the first and second descriptor values and a rule for converting the input color space to the output color space.

According to a third aspect the present invention provides an article of manufacture comprising a program storage medium readable by a computer, the medium tangibly embodying one or more programs of instructions executable by a computer to perform a method comprising: obtaining a first descriptor value for an input color space associated with presentation data in a data stream received for output at a presentation device; obtaining a second descriptor value for an output color space of the presentation device; and using the first and second descriptor value to obtain a link color conversion color management resource (CMR) comprising the first and second descriptor values and a rule for converting the input color space to the output color space.

By including the descriptor values for the input and output color space in the link color management resource along with a rule for converting from the input color space to the output space, the link color management CMR can, for example, easily be found once descriptors for the input color space and output color space have been obtained for the presentation data and presentation device, respectively.

Preferably the link color conversion CMR pre-exists and is obtained from storage by matching the first and second descriptor values with descriptor values stored in a link color conversion CMR and associated with a rule for converting the input color space to the output color space.

Alternatively the link color conversion CMR does not pre-exist and is created. To create a link color conversion CMR a rule is created for converting from the input color space to the output color space and stored in the link color conversion CMR with the first and second descriptor values. For example the rule is created by combining a rule for converting the first color space to an intermediate format with a rule for converting the intermediate format to the second color space.

Preferably the first and second descriptor values uniquely identify the color spaces which they represent. For example an Object ISO-based object identifier (Object OID) may be used.

Optionally, for example, the present invention is implemented in a print server. In this case the obtained link color conversion CMR is associated with an output data stream comprising the presentation data and for sending to the presentation device for outputting the presentation data.

Optionally for example, the present invention is implemented in a presentation device, In this case the rule is used to convert the presentation data from the first color space to the second color space. The converted presentation data is then output in the second color space.

Note that data processing system of the present invention may comprise a software component, hardware component, firmware component, or any combination thereof, for performing one or more method steps of the present invention. Further, in the data processing system of the present invention such components are generally named using a noun form of a verb which could be used to characterize the process step which the component performs. For example the process step of "obtaining" is performed by an "obtainer" component.

DESCRIPTION OF THE FIGURES

FIG. 3 is an illustration of the structure of a Resource Access Table (RAT) Repeating Group (RG) which include details of a plurality of link color conversion CMRs which are linked to an audit color conversion CMR.

DESCRIPTION OF INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The preferred embodiment of the present invention is defined in the terms of an AFP architecture. However a skilled person will realize that the mechanisms described are applicable to other presentation environments as well, for example non-AFP environments such as PostScript, PDF, and PCL.

In the AFP architecture a Mixed Object: Document Content Architecture (MO:DCA) printfile, which may contain multiple documents and multiple document components, is provided to a print server for output. The print server then generates an Intelligent Printer Data Stream (IPDS) command stream for sending to a presentation device such as a printer or other output device for the purpose of outputting the printfile.

Related application U.S. Ser. No. 11/077,687—Method and apparatus for color management discloses a color management system which uses a Color Management Resource (herein also CMR) for improving the accuracy and consistency of output in color printing. The present invention improves on this system by adding a new type of CMR which is termed a link color conversion CMR.

According to U.S. Ser. No. 11/077,687 a CMR is an architected resource that is used to carry color management information required to render a print file, document, page, or data object. In AFP environments, CMRs are processed as AFP resources by print servers so they can be downloaded once, captured, and used repeatedly without requiring additional downloads. A CMR is associated with a document component to which it relates and is described in terms of its type and processing mode. For example CMR types are: color conversions, halftone screens, and calibration curves. For example processing modes are: audit and instruction. An audit CMR is a CMR which specifies processing that has been done on a document component, and an instruction CMR specifies processing that is to be done to a document component. Further each CMR is uniquely identified by a unique Object OID (OID). This OID is generated by well-defined rules which are accepted in the industry and used by other object types within AFP.

Figure 1:
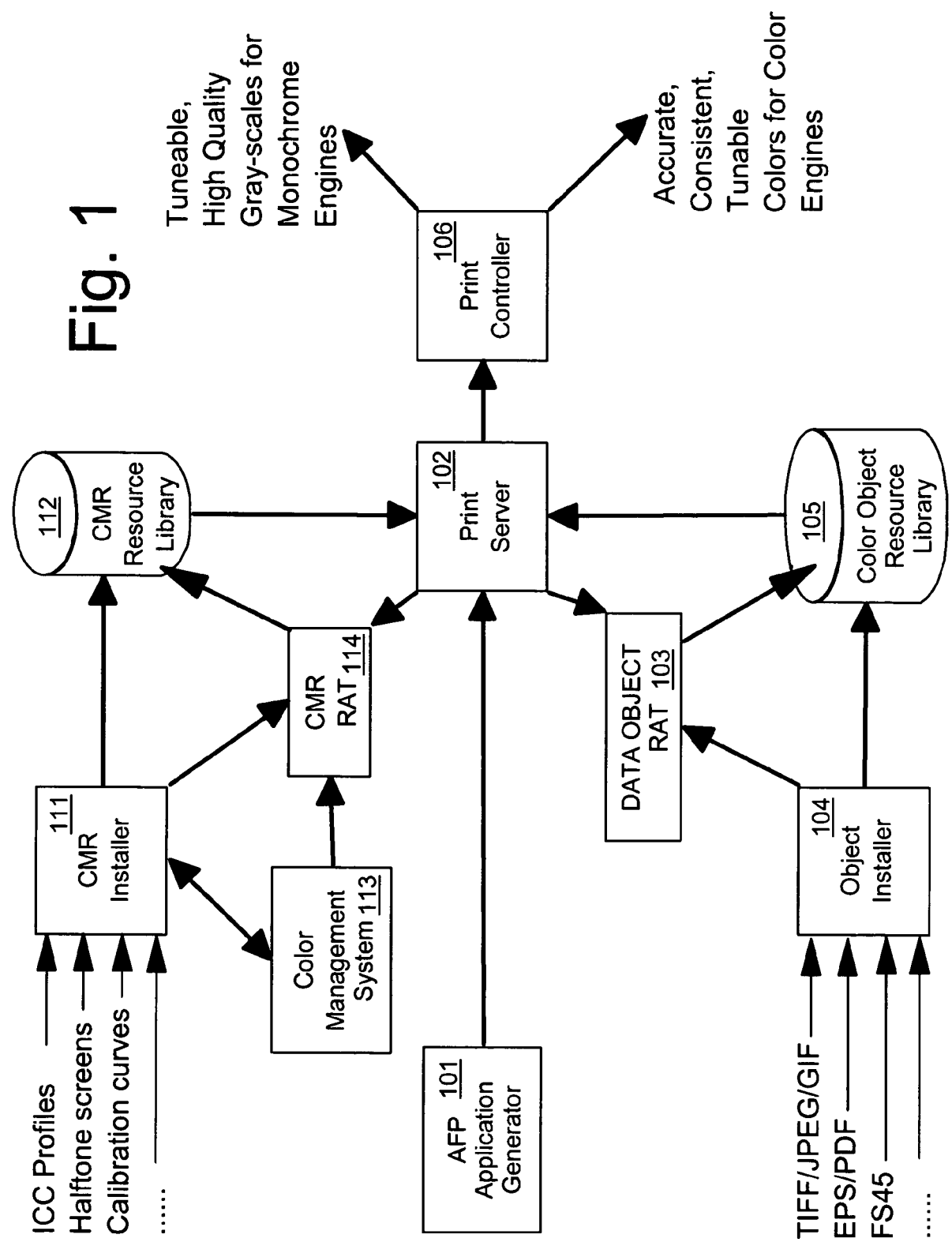
FIG. 1 is a schematic diagram of an example AFP environment in which the preferred embodiment of the present invention will be advantageously applied.

FIG. 1 is a schematic diagram of an AFP environment which includes a color management system used to generate accurate and consistent output on color and monochrome devices according to U.S. Ser. No. 11/077,687. In the figure an AFP application generator 101 sends an MO:DCA-P document to print server 102 for outputting. Note that for the purposes of this description it is assumed that the MO:DCA-P document includes a reference to a data object and a reference to a CMR, both of which were previously been installed and are accessible to print server 102.

The data object could, for example, be a TIFF/JPEG/GIF object, a EPS/PDF object, an FS45 object, or other object of a defined format. The data object was previously installed via Object Installer 104 which stored the data object in a data object resource library 105 and further stored details of the data object, and where it is installed, in an entry of a Data Object Resource Access Table (RAT) 103. The Data Object RAT 103 is effectively an index which the print server 102 may use to locate the data object in storage.

The CMR was previously installed via CMR installer 111 which stored the CMR in a CMR resource library 112 and further stored details of the CMR including its name and location in storage in an entry of a CMR Resource Access Table (RAT) 114. The CMR may have been created using the Color Management System (CMS) 113 which can be used to generate a CMR, for example through a user interface or from an existing profile, such as an ICC profile. Further the CMR may, for example, be device independent and usable for a plurality of devices, or device specific and usable only for a specific device or specific type of device. If the CMR is device independent, details may also be included in the CMR RAT 114 entry for the CMR which link it to one or more device specific CMRs.

When the print server 102 receives the MO:DCA-P document from AFP application generator 101 it converts it to an IPDS command stream. As part of this process it obtains the name of the CMR from the reference in the data-stream and uses the name to locate the entry in the CMR RAT 114 which relates to the CMR. From this the print server 102 obtains the CMR and imbeds it and commands to activate and invoke it, into the IPDS command stream. However if the CMR is a device independent CMR which is linked to device specific CMRs, the print server may replace the device independent CMR with a device specific CMR which is specific to the intended output device. Further the print server 102 obtains the name of the data object from the data object reference and uses the name to locate the entry in the Data Object RAT 103 which relates to the data object. As a result the Print Server 102 obtains the data object and imbeds it into the IPDS command stream. Finally, when the IPDS command stream is complete, print server 102 provides the IPDS command stream to print controller 106 for providing to a presentation device.

Note that alternatively to the reference to a CMR being included and associated with the data object in the MO:DCA-P document sent to the print server, the Data Object RAT 102 entry for a data object may include details of a CMR to use when processing the data object. Such details include the name and processing mode of the CMR, the processing mode indicating whether it is an audit CMR or instruction CMR. In this case the Print Server 102 obtains the CMR via the CMR RAT 114 and imbeds it, or a linked device specific CMR, into the IPDS command stream with commands to invoke it while the data object is processed. For example an audit CMR could be a color conversion CMR which contains the ICC profile of a digital camera which was used to create the data object.

According to the preferred embodiment of the present invention a new CMR is defined which is termed a link color conversion CMR. This is achieved by defining a new processing mode of "link" and a new type of color conversion CMR which is used to link an input color space in the presentation data to the output color space of the presentation device.

A link color conversion CMR is based on ICC device link profiles and provides look up tables (LUTs) that directly convert from an input color space in presentation data to an output color space of a presentation device. For more information on ICC profiles and rendering intents, see the International Color Consortium Specification ICCx, File Format for Color Profiles, where x stands for the current level of the specification.

A Link Color Conversion CMR comprises a color conversion rule for converting from an input color space to an output color space. This rule is created by combining input and output color conversion rules. The created rule is then tied to unique descriptors associated with each of the input and output color conversion rules. Accordingly, the linked color conversion structure contains three parts—the descriptor of the input color conversion rule, the descriptor of the output color conversion rule, and the combined color conversion rule. By comparing the descriptor values, it is possible to very rapidly identify a previously-existing linked color conversion that combines the input and output conversions. The combining work does not need to be re-done.

Figure 2:
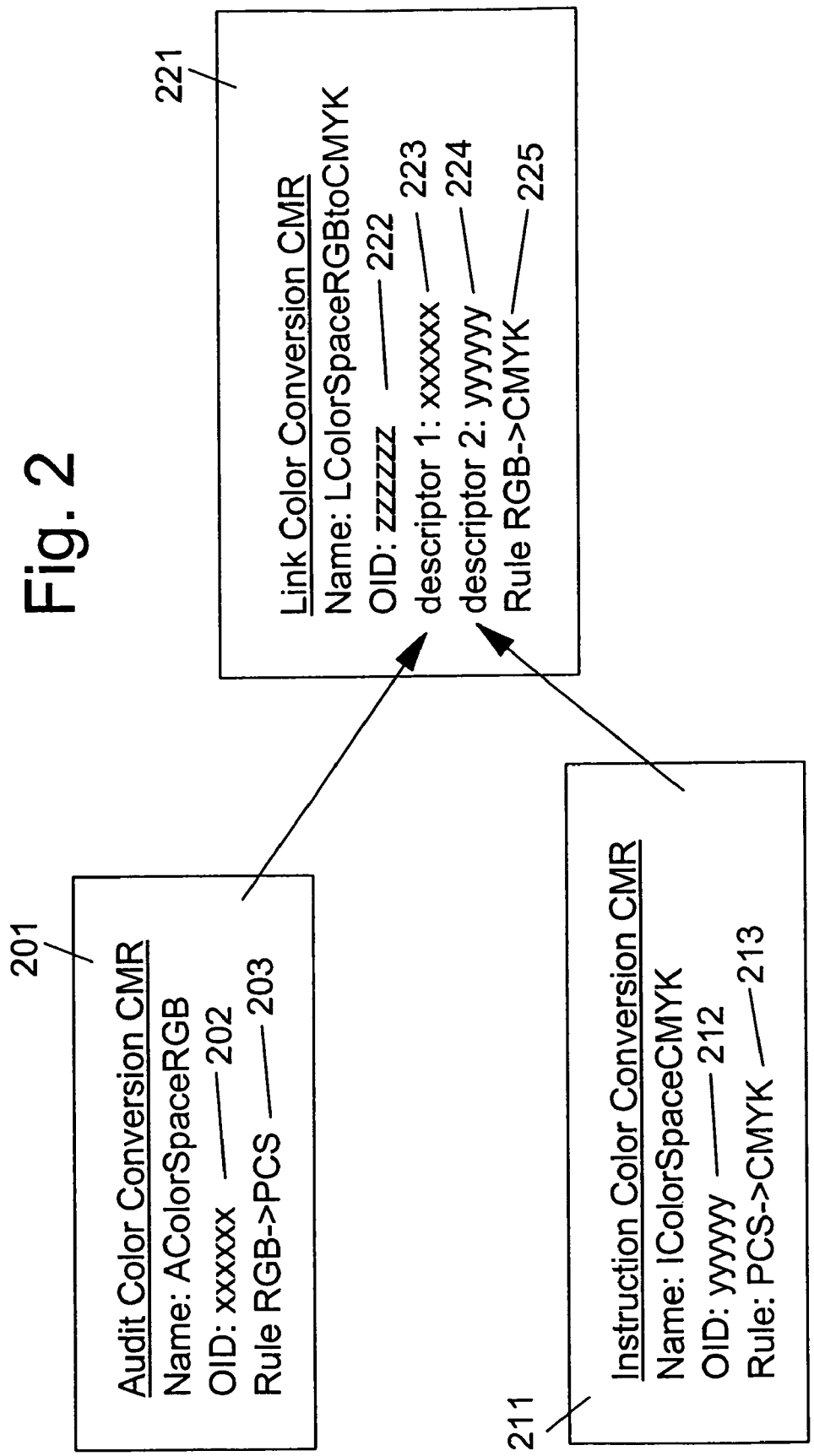
FIG. 2 is a schematic diagram which shows an example of details which a link color conversion CMR may contain.

FIG. 2 is a schematic diagram which shows an example of details which a link color conversion CMR 221 may contain. The figure shows an audit color conversion CMR 201 which contains an object OID 202 and rule 203 for converting from an input color space (RGB) to an intermediate format (PCS), and an instruction color conversion CMR 211 which contains an object OID 212 and rule 213 for converting from an intermediate format (PCS) to an output color space (CMYK). In the prior art both of these CMRs may be used during output of presentation data by a presentation device, this requiring two conversions to be performed to convert from the input color space to the output color space. However, in the preferred embodiment of the present invention a link color conversion CMR 221 is created, This CMR contains: an object OID 222; a first descriptor value 223 which is used to identify the input color space and is set to the object OID 202 of the audit color conversion CMR 201 which defined the input color space (RGB); a second descriptor value 224 which identifies the output color space and is set to the object OID 212 of the instruction color conversion CMR 201 which defined the output color space (CMYK); and a rule 225 which converts directly from the input color space to the output color space. Advantageously, by including a single rule for the conversion, this CMR may be used to reduce the processing required to convert from the input color space to the output color space compared to using separate audit color conversion and instruction color conversion CMRs. Further by including the object OIDs of the input and output color space the link color conversion CMR can be easily found whenever presentation data is processed which is associated with an audit color conversions CMR of the same Object OID.

Note that alternatively to using object OID's for descriptors, other identifiers could be used, for example the names of the audit and instruction color conversion CMRs, or names which identify the color spaces. However it is preferable to use identifiers which are guaranteed to be unique.

Link color conversion CMRs are resources that are generated and processed internally in AFP systems; they are not exposed to the AFP application or the job submitter. The accuracy of a link color conversion CMR is heavily dependent on the accuracy of the description of the input colors using audit color conversion CMRs, therefore AFP applications, document generators, and resource generators are encouraged to focus on defining the input colors as accurately as possible. Link color conversion CMRs are essential for presentation device performance; therefore a main goal of the AFP color management system is to provide link color conversion CMRs for the presentation device whenever it needs to convert from an input color space in the presentation data to its own output color space. Only link color conversion CMRs can be processed as link CMRs. link color conversion CMRs can be thought of as side files that are built by the color management system to optimize system performance.

Note that while in general CMRs can be device-independent or device-specific, link color conversion CMRs are only device-specific. Link color conversion CMRs are considered to be device-specific to the device-type for the output color space. That is, if the link color conversion CMR maps scanner (x) RGB to the Infocolor 130+CMYK, it is considered to be device-specific to the Infocolor 130+. Device-specific CMRs can specify, for example, the manufacturer and the device type and device model number in the CMR name.

CMRs are installed with a workstation-based CMR Installer (for example, an extension of the Windows-based Font Installer that was developed for TrueType/OpenType fonts). This program will (1) upload the CMR into the resource library of a supporting system such as, for example, a PSF/390, PSF/400, or IPM print server, and (2) build a Resource Access Table (RAT) entry that maps the CMR name to a file name, to an object-OID, and possibly to other CMR's.

For example, if the CMR is an audit color conversion CMR which defines an input color space this may be linked to one or more link color conversion CMRs which define a conversion rule for converting from the input color space to a different color space. Further for example, if the CMR is an audit color conversion CMR link color conversion CMRs may be created to convert the input color space of the audit color conversion CMR to a plurality of known output color spaces. The created link color conversion CMRS may then be linked to the installed audit color conversion CMR.

CMR are linked via the CMR resource access table (RAT). The RAT used for CMRs is analogous to the TrueType font RAT but is a separate table with filename "IBM_ColorManagementResource.rat".

When a print server server builds an IPDS command stream from an output document for sending to a presentation device, it ensures that all CMR's referenced in the command stream are also provided to the presentation device. For example, when the print server accesses the CMR RAT with a reference to an audit color conversion CMR referenced in an output document it may encounter Link Color Conversion CMRs which are 'mapped' to the referenced audit CMR. In this case, the print server uses the current target presentation device type to select an appropriate link color conversion CMR which is linked to the audit color conversion CMR and provides an efficient means for converting the input color space defined by the audit CMR to the output color space of the target presentation device. The selected link Color Conversion CMR is then added to the IPDS command stream for use by the presentation device.

Note that in AFP environments, an audit or instruction CMR can be associated with an MO:DCA document component and becomes a part of the CMR hierarchy which the presentation device uses to apply color management to presentation data. However, a link color conversion CMR is not tied into the CMR hierarchy used by the presentation device, instead it is sent to the presentation device by the server and is always used if a color conversion is needed to render presentation data and that conversion is defined precisely by that link color conversion CMR.

Further note that the use of link color conversion CMRs in a presentation device can involve the concept of rendering intent. Rendering intent is used to modify the appearance of color data. Rendering intents supported in AFP color management are based on the rendering intents defined by the ICC, which are also used in other presentation environments such as PostScript and PDF. Four rendering intents are defined by the ICC: Perceptual; Saturation; Media-relative calorimetric; and ICC-absolute colorimetric For example. rendering intents may be associated with an MO:DCA document component at the same levels of the document hierarchy as CMRs—printfile, document, page/overlay, and data object. In addition, rendering intents are specified independently for each major AFP color object type category, as follows: IOCA objects; Object containers (EPS, PDF, TIFF, etc.); PTOCA text; GOCA graphics objects. This allows one object type, e.g. text, to be rendered with a different rendering intent than another object type, e.g. continuous tone IOCA image.

To support rendering intents a link color conversion CMR can comprise four lookup tables one for each possible rendering intent. When a presentation device identifies a current rendering intent it selects the appropriate LUT for the rendering intent.

Note that if a presentation device cannot find a link color conversion CMR which provides the required color conversion, it can generate one or a portion of one. For example a link color conversion CMR can be created if the device knows the OIDs of both the input and output color spaces based on audit and instruction color conversion CMRs. Alternatively the device can create the OID using the well-defined generation mechanism Alternatively the host system can create and download the linked color conversions separate from an output data stream.

CMR's which are located in resource library are accessed via a resource access table (RAT). The CMR name is used to index the RAT, and the RAT repeating group (RG) for that CMR name provides all of the information required by the print server to find and process the CMR. The RAT RG may map the CMRname directly to a file name, or it may map the CMRname to one or more different CMRnames. For example, an audit color conversion CMR may be mapped to one or more link color conversion CMRs which provide conversion rules from the color space defined in the audit color conversion CMR. This mechanism allows an appropriate link color conversion CMR to be found for a given audit color conversion CMR and presentation device.

Each RAT RG contains one or more table vectors (TVs) which specify processing information. TVs are differentiated by their type. One particular TV type carries the CMR file name, another carries the CMR object OID, another carries links to one or more other RG's which define other CMR's, for example link color conversion CMRs which are mapped to the referenced CMR, etc.

FIG. 3 shows an example structure of a RAT entry for an audit color conversion CMR which is linked to three link color conversion CMRs each of which define a conversion rule from the color space of the audit color conversion CMR to another color space. Referring to the figure, the first RG contains three TV's, the first TV 301 contains details of the file name of the audit color conversion CMR, the second TV 302 contains the object OID of the audit color conversion CMR, and the third TV 303 provides details of 3 other RG's which define the 3 linked link color conversion CMRs. There then follows the 3 other RGs, each comprising two TVs which define the name and object OID for one link color conversion CMR.

In summary the preferred embodiment of the present invention provides that the management of color presented at end point devices such as a display or printer is based on the implementation of a Color Management Resource (herein also CMR). A CMR is an architected resource stored accessibly to a print server or other processor that is used to carry all of the color management information required to render a print file, document, page, or data object. The embodiment here described is particularly focused on a color conversion type of CMR and defines a new type here called a Link Color Conversion CMR. In particular, a unique descriptor is tied to each input and output color conversion rule. A linked color conversion rule, created by combining the input and output color conversion, is created. The linked color conversion structure contains three parts—the descriptor of the input color conversion rule, the descriptor of the output color conversion rule, and the combined color conversion rule. By comparing the descriptors, it is possible to very rapidly identify a previously-existing linked color conversion that combines the input and output conversions.

In many cases, a pre-built Link Color Conversion CMR is available to the printer that performs the same function as a selected pair of audit and instruction CMRs, but provides for more efficient processing. Link Color Conversion CMRs can either be built by the printer as needed or can be activated as link CMRs; link CMRs do not need to be invoked.

The foregoing description of the exemplary embodiment of the invention has been presented for the purposes of illustration and description. It is not intended to be exhaustive or to limit the invention to the precise form disclosed, Many modifications and variations are possible in light of the above teaching. It is intended that the scope of the invention be limited not with this detailed description, but rather by the claims appended hereto.

What is claimed is:

1. A method operable on a data processing system including a print server and a presentation device for color conversion on the presentation device, the method comprising:
   receiving, by the print server, a presentation datastream including presentation data and a first descriptor value identifying an input color space of the presentation data;
   processing, by operation of the print server, the presentation datastream to identify the first descriptor value;
   identifying, by operation of the print server, a second descriptor value for an output color space of the presentation device;
   identifying, by operation of the print server, a link color conversion Color Management Resource (CMR) using the first descriptor value from the presentation datastream and the second descriptor value, wherein the link color conversion CMR includes the first descriptor value, the second descriptor value, and a rule for converting the input color space to the output color space; and
   transmitting, from the print server to the presentation device, the link color conversion CMR and the presentation datastream for use by the presentation device to convert the presentation data for output at the presentation device.

2. The method of claim 1 wherein identifying the link color conversion CMR comprises:
   creating the rule for converting the input color space to the output color space;
   associating the first descriptor value and the second descriptor value with the rule for converting; and
   storing the rule for converting and the associated descriptor values in the link color conversion CMR.

3. The method of claim 2 wherein creating the rule for converting comprises:
   identifying a first rule for converting the input color space to an intermediate format color space;
   identifying a second rule for converting the intermediate format color space to the output color space; and
   creating the rule for converting the input color space to the output color space by combining the first rule for converting and the second rule for converting.

4. The method of claim 1 wherein identifying the link color conversion CMR comprises:
   locating the link color conversion CMR in a storage by matching the first descriptor value and the second descriptor value with descriptor values within the link color conversion CMR.

5. The method of claim 1 further comprising:
   converting, by operation of the presentation device, the presentation data from the input color space to the output color space using the rule for conversion; and
   outputting, by operation of the presentation device, the converted presentation data in the second color space on the presentation device.

6. The method of claim 1 wherein the first descriptor value and the second descriptor value are Object OIDs.

7. A data processing system comprising:
   a print server operable to receive a presentation datastream including presentation data and a first descriptor value identifying an input color space for the presentation data, and to process the presentation datastream to identify the first descriptor value; and
   a presentation device operable to present the presentation data,
   wherein the print server is further operable to identify a second descriptor value for an output color space of the presentation device, to identify a link color conversion Color Management Resource (CMR) using the first descriptor value from the presentation datastream, the second descriptor value, and a rule for converting the input color space to the output color space, and
   wherein the presentation device is further operable to receive the link color conversion CMR and the presentation datastream, to convert the presentation data from the input color space to the output color space using the link color conversion CMR, and to present the converted presentation data on the presentation device.

8. The data processing system of claim 7 further comprising:
   a storage operable to store a link color conversion CMR,
   wherein the print server is further operable to create the rule for converting the input color space to the output color space, to associate the first descriptor value and the second descriptor value with the rule for converting, to include the rule for converting and the associated descriptor values in the link color conversion CMR, and to store the link color conversion CMR in the storage.

9. The data processing system of claim 8 wherein the print server is further operable to identify a first rule for converting the input color space to an intermediate format color space, to identify a second rule for converting the intermediate format color space to the output color space, and to create the rule for converting the input color space to the output color space by combining the first rule for converting and the second rule for converting.

10. The data processing system of claim 7 wherein the print server is further operable to identify the link color conversion CMR in a storage by matching the first descriptor value and the second descriptor value with descriptor values within the link color conversion CMR.

11. The data processing system of claim 7 wherein:
   the print server is further operable to convert the presentation data from the input color space to the output color space, and
   the presentation device is further operable to output the converted presentation data.

12. The data processing system of claim 7 wherein the first descriptor value and the second descriptor value are Object OIDs.

13. A non-transitory computer readable medium tangibly embodying programmed instructions which, when executed by a computer system, are operable for performing a method of color conversion on a presentation device, the method comprising:
   receiving a presentation datastream including presentation data and a first descriptor value identifying an input color space of the presentation data;
   processing the datastream to identify the first descriptor value;
   identifying a second descriptor value for an output color space of the presentation device;
   identifying a link color conversion Color Management Resource (CMR) using the first descriptor value from the presentation datastream and the second descriptor value, wherein the link color conversion CMR includes the first descriptor value, the second descriptor value, and a rule for converting the input color space to the output color space; and transmitting the link color conversion CMR and the presentation datastream to the presentation device for use by the presentation device to convert the presentation data for output at the presentation device.

14. The non-transitory computer readable medium of claim 13 wherein identifying the link color conversion CMR comprises:

creating the rule for converting the input color space to the output color space;

associating the first descriptor value and the second descriptor value with the rule for converting; and storing the rule for converting and the associated descriptor values in the link color conversion CMR.

15. The non-transitory computer readable medium of claim 14 wherein creating the rule for converting comprises:

identifying a first rule for converting the input color space to an intermediate format color space;

identifying a second rule for converting the intermediate format color space to the output color space; and creating the rule for converting the input color space to the output color space by combining the first rule for converting and the second rule for converting.

16. The non-transitory computer readable medium of claim 13 wherein the method further comprises:

locating the link color conversion CMR in a storage by matching the first descriptor value and the second descriptor value with descriptor values within the link color conversion CMR.

17. The non-transitory computer readable medium of claim 13 wherein the method further comprises:

converting the presentation data from the input color space to the output color space; and outputting the converted presentation data in the output color space on the presentation device.

18. The non-transitory computer readable medium of claim 13 wherein the first descriptor value and the second descriptor value are Object OIDs.

* * * * *